United States Patent
Rouse et al.

(10) Patent No.: US 10,180,247 B1
(45) Date of Patent: Jan. 15, 2019

(54) DEVICE AND METHOD FOR PLACEMENT OF LIGHT SOURCE ON A HEAT SINK

(71) Applicant: Valeo North America, Inc., Troy, MI (US)

(72) Inventors: Chase Rouse, Seymour, IN (US); Jonathan Blandin, Seymour, IN (US); Brian Guinn, Seymour, IN (US); Marc Duarte, Seymour, IN (US)

(73) Assignee: Valeo North America, Inc., Troy, MI (US)

( * ) Notice: Subject to any disclaimer, the term of this patent is extended or adjusted under 35 U.S.C. 154(b) by 0 days.

(21) Appl. No.: 15/640,828

(22) Filed: Jul. 3, 2017

(51) Int. Cl.
| | |
|---|---|
| *F21V 19/00* | (2006.01) |
| *F21V 29/503* | (2015.01) |
| *F21V 29/89* | (2015.01) |
| *B23K 26/362* | (2014.01) |
| *B23K 26/40* | (2014.01) |
| *B23K 103/10* | (2006.01) |
| *B23K 103/16* | (2006.01) |

(52) U.S. Cl.
CPC .......... *F21V 29/503* (2015.01); *B23K 26/362* (2013.01); *B23K 26/40* (2013.01); *F21V 29/89* (2015.01); *B23K 2103/10* (2018.08); *B23K 2103/166* (2018.08); *B23K 2203/10* (2013.01); *B23K 2203/166* (2015.10)

(58) Field of Classification Search
CPC ....... F21V 29/503; F21V 29/89; B23K 26/40; B23K 26/362; B23K 2103/166; B23K 2103/10; B23K 2203/166; B23K 2203/10
See application file for complete search history.

(56) References Cited

U.S. PATENT DOCUMENTS

| | | | |
|---|---|---|---|
| 5,061,341 A * | 10/1991 | Kildal | .................... B23K 26/18 216/58 |
| 5,824,374 A | 10/1998 | Bradley, Jr. et al. | |
| 5,925,069 A | 7/1999 | Graves et al. | |
| 2011/0058372 A1* | 3/2011 | Lerman | ................ H05K 1/0204 362/235 |
| 2011/0207328 A1 | 8/2011 | Speakman | |

FOREIGN PATENT DOCUMENTS

JP          7-204871 A          8/1995

\* cited by examiner

*Primary Examiner* — Ali Alavi
(74) *Attorney, Agent, or Firm* — Oblon, McClelland, Maier & Neustadt, L.L.P.

(57) ABSTRACT

According to aspects of the disclosed subject matter, a method of placing a solid state light source on a heat sink can include coating a surface of the heat sink with an anodized coating or an e-coating, for example. A portion of the coated surface can be treated via laser ablation for placing the solid state light source. Additionally, the laser ablation parameters can be adjusted to provide a predetermined roughness to the treated portion of the coated surface.

20 Claims, 5 Drawing Sheets

| Marking Times | Marking Speed (mm/s) | Air Conditioning Speed (mm/s) | Q frequency/KHz | Q Release/second | Power (%) |
|---|---|---|---|---|---|
| 1 | 4000 | 2000 | 100 | 1.5 | 100 |
| 2 | 3500 | 2000 | 100 | 1.5 | 60 |
| 3 | 3500 | 2000 | 100 | 1.5 | 60 |
| 4 | 3500 | 2000 | 100 | 1.5 | 60 |
| 5 | 3500 | 2000 | 100 | 1.5 | 60 |
| 6 | 2500 | 2000 | 90 | 1.5 | 40 |
| 7 | 2500 | 2000 | 90 | 1.5 | 40 |
| 8 | 2500 | 2000 | 85 | 1.5 | 30 |
| 9 | 2500 | 2000 | 85 | 1.5 | 30 |
| 10 | 4000 | 2000 | 100 | 1.5 | 100 |

DEVICE AND METHOD FOR PLACEMENT OF LIGHT SOURCE ON A HEAT SINK

FIELD OF INVENTION

The present invention relates to a heat sink on which a lighting component can be placed, and more particularly, to a coated heat sink on which a solid state light source can be placed.

DISCUSSION OF BACKGROUND ART

Electronic components are often mounted to a heat sink to dissipate heat from the component during operation. For example, solid state light sources are often mounted to a heat sink to improve performance and/or reliability of the solid state light source.

In general, as power outputs of a solid state light source increase, heat dissipation capability of the heat sink must also increase. Heat dissipation can be improved by increasing the size of the heat sink. However, size requirements for the solid state light source/heat sink assembly are decreasing, particularly in the automotive lighting industry. Further, alternative methods of improving the heat dissipation, such as coating the heat sink, may adversely affect coupling of the solid state light source to the heat sink or thermal transfer from the solid state light source to the heat sink.

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

SUMMARY

The foregoing paragraphs have been provided by way of general introduction, and are not intended to limit the scope of the following claims. The described embodiments, together with further advantages, will be best understood by reference to the following detailed description taken in conjunction with the accompanying drawings.

One objective of the invention is to provide a heatsinked lighting component, which has adequate heat dissipation as well as coupling between the component and heat sink. The heatsinked lighting component may be coupled to a vehicle, the heatsinked lighting component providing illumination for vehicle operation.

According to aspects of the disclosed subject matter, a method of placing a solid state light source (e.g., LED, OLED, wireleds, monolithic source, polymer LED, etc.) on a heat sink can include coating a surface of the heat sink with an anodized coating or an e-co ting, for example. A portion of the coated surface can be treated via laser ablation for placing the solid state light source. Additionally, the laser ablation parameters can be adjusted to provide a predetermined surface finish to the treated portion of the coated surface. In an embodiment, the heatsink may be coupled to a vehicle in a predetermined location. In an embodiment, a lighting device may comprise the heatsink as further described herein.

According to aspects of the disclosed subject matter, a method of treating a heat sink for a light element includes providing a heat sink having a coated surface; treating a mounting region of the coated surface by laser ablation, wherein the mounting region is for placing a light element on the heat sink; and adjusting parameters of the laser ablation treating to adapt the mounting region for mechanical coupling and thermal coupling of the light element to the heat sink. In an embodiment, the heat sink is aluminum.

In an embodiment, the coated surface of the heat sink includes an anodized coating ranging in thickness from 6 micrometers to 8 micrometers.

In an embodiment, the scale with which laser ablation can treat the anodized surface is in micrometers.

In an embodiment, the predetermined roughness of the treated portion of the anodized surface includes predetermined patterns.

In an embodiment, wherein the adjusting comprises adjusting the laser ablation to provide a predetermined pattern adapted for adhesion of the light element to the heat sink.

In an embodiment, wherein the coated surface includes an anodized coating, an e-coating, or paint.

In an embodiment, the light element is a solid state light source.

In an embodiment, the laser parameters include marking times, marking speed (mm/s), air conditioning speed (mm/s), Q frequency/KHz, Q release/second, and power (%).

In an embodiment, predetermined laser parameters correspond to a predetermined surface roughness of the mounting region of the heat sink.

In an embodiment, a heat sink for mounting a light element includes a coating covering at least a portion of the surface of the heat sink; a mounting region on the coating and which is configured to mount the light element; and a light element placed on the mounting region, wherein the mounting region has properties different from that of the coating and configured to provide mechanical coupling and thermal coupling requirements of the light element to the heat sink.

In an embodiment, the heat sink includes the coating including an anodized coating, an e-coating, or paint.

In an embodiment, the mounting region of the heat sink has a predetermined amount of said coating removed.

In an embodiment, the predetermined roughness of the mounting regions is based on Ra roughness, wherein Ra roughness is the mathematical averages of the difference in heights of the peaks and valleys measured for a specified area.

In an embodiment, the predetermined roughness of the mounting region corresponds to an Ra range of 1 micrometers to 5 micrometers.

In an embodiment, the predetermined roughness of the mounting region is 2 micrometers.

In an embodiment, the mounting region includes predetermined patterns wherein at least one of the predetermined patterns includes a cross-hatching pattern tuned for adhesion of the light element to the heat sink.

In an embodiment, the coated surface of the heat sink includes an anodized coating ranging from 6 micrometers to 8 micrometers.

In an embodiment, the laser parameters include marking times, marking speed (mm/s), air conditioning speed (mm/s), Q frequency/KHz, Q release/second, and power (%).

In an embodiment, power of the laser can range from 20 W to 50 W, marking times can be up to 10 iterations, marking speed can range from 2000 to 4000 mm/s, bounce speed can typically be 2000 mm/s, Q (frequency/KHz) can range from 80 to 100, and Q (release/s) can typically be 1.5.

In an embodiment, the predetermined laser parameters correspond to a predetermined surface roughness of the mounting region of the heat sink.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Figure 1:
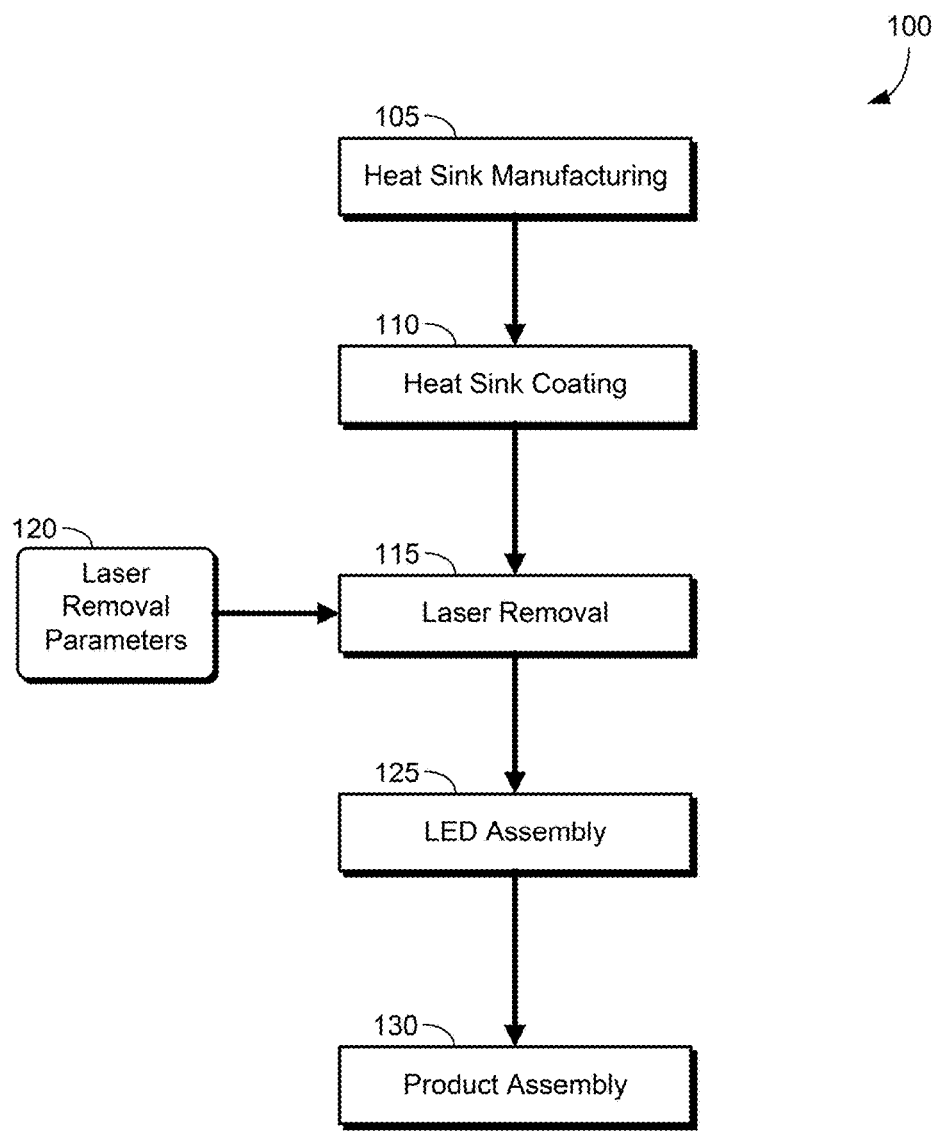
FIG. 1 depicts an exemplary solid state light source placement operational workflow according to one or more aspects of the disclosed subject matter.

The description set forth below in connection with the appended drawings is intended as a description of various embodiments of the disclosed subject matter and is not necessarily intended to represent the only embodiment(s). In certain instances, the description includes specific details for the purpose of providing an understanding of the disclosed subject matter. However, it will be apparent to those skilled in the art that embodiments may be practiced without these specific details. In some instances, well-known structures and components may be shown in block diagram form in order to avoid obscuring the concepts of the disclosed subject matter.

Reference throughout the specification to "one embodiment" or "an embodiment" means that a particular feature, structure, characteristic, operation, or function described in connection with an embodiment is included in at least one embodiment of the disclosed subject matter. Thus, any appearance of the phrases "in one embodiment" or "in an embodiment" in the specification is not necessarily referring to the same embodiment. Further, the particular features, structures, characteristics, operations, or functions may be combined in any suitable manner in one or more embodiments. Further, it is intended that embodiments of the disclosed subject matter can and do cover modifications and variations of the described embodiments.

It must be noted that, as used in the specification and the appended claims, the singular forms "a," "an," and "the" include plural referents unless the context clearly dictates otherwise. That is, unless clearly specified otherwise, as used herein the words "a" and "an" and the like carry the meaning of "one or more." Additionally, it is to be understood that terms such as "left," "right," "top," "bottom," "front," "rear," "side," "height," "length," "width," "upper," "lower," "interior," "exterior," "inner," "outer," and the like that may be used herein, merely describe points of reference and do not necessarily limit embodiments of the disclosed subject matter to any particular orientation or configuration. Furthermore, terms such as "first," "second," "third," etc., merely identify one of a number of portions, components, points of reference, operations and/or functions as described herein, and likewise do not necessarily limit embodiments of the disclosed subject matter to any particular configuration or orientation.

As noted above, it is desirable to provide a heatsinked lighting component with improved heat dissapation without increasing the size of the heat sink. One way to improve heat dissipation of such a lighting component is to coat a surface of the heat sink, for example, by anodizing. Anodizing is an electrochemical process that converts the metal surface into a decorative, durable, corrosion-resistant, anodic oxide finish. Aluminum, for example, can be suited to anodizing, although other nonferrous metals, such as magnesium and titanium, also can be anodized. The present inventors have recognized, however, that an anodized coating may decrease the shear strength of a light source mounted on the heat sink. Further, coatings may reduce heat transfer from the light component to the heat sink. Special purpose thermal adhesives may be used to mount the lighting component to the heat sink, but heat dissapation and shear strength requirements may vary widely among different light assemblies, making it necessary to match adhesive types to a particular application.

Generally, a pre-coating masking process may be used to leave portions of the heat sink, such as a light component mounting area, untreated from the coating process. However, the inventors recognized the native properties of the uncoated heat sink material may not be suitable for a particular application. For example, cleaning of the surface, and/or modification of surface finish may be necessary to ensure proper bonding with the light source component. Further, masking is imprecise and may leave too much or too little of the heat sink surface area untreated, particularly where the the light element is small, as is the trend. Finally, masking s generally labor intensive, especially for small or complex shapes, leading to excessive production cost.

The inventors discovered that adding a post-process laser removal step to remove at least a portion of the coating can reduce cost and improve precision in size and placement of the uncoated area of the heat sink, especially compared to any masking technique. For example, a heat sink can include anodization (e.g., black anodization due to its increased emissivity) for thermal dissipation, but the heat sink can have increased thermal performance without any anodized coating between the lighting component and the heat sink. The coated surface of the heat sink may include an anodized coating ranging in thickness from 6 micrometers to 8 micrometers. However, the thickness range may change as laser technology changes. It should be appreciated that the anodization may not be limited to black anodization, but due to an increased emissivity provided by black anodization, black anodization may be used with reference to the examples described herein. A laser can be used to remove the black anodized coating in the precise mounting area of the selected lighting component. The coating can be removed in micro layers and/or in complete coatings, which can be more accurately done than traditional masking methods. Further, the post-process laser removal step can be controlled to tune a surface finish amount and/or thermal properties of the mounting area for the lighting component. For example, surface finish in the mounting area can be controlled by forming a predetermined pattern and/or by controlling a removal amount of the coating as further described herein. These techniques also permit surface treatment of the native heat sink material as desired.

Referring now to the drawings, wherein like reference numerals designate identical or corresponding parts throughout the several views.

FIG. 1 depicts an exemplary solid state light source placement workflow 100 according to one or more aspects of the disclosed subject matter. The solid state light source placement workflow 100 is used to aid in placing a solid state light source on a heat sink when the heat sink is coated with an additional material (e.g., anodized coating). The solid state light source placement workflow 100, in some implementations, can include heat sink manufacturing 105 in which a heat sink can be manufactured by molding, machining, stamping, and the like. The heat sink can be manufactured to any predetermined specifications corresponding to the purpose of the heat sink.

After the heat sink is manufactured, the heat sink may include a coating process such as heat sink coating 110. The heat sink may be coated according to any predetermined design specifications. The coating may include an anodized coating, an e-coating (electrocoating), paint, and the like. The solid state light source placement workflow 100 also includes post-coating laser removal 115.

Laser removal 115 can receive laser removal parameters 120, related to the type of coating, the thickness of the coating, the heat sink material, a desired surface finish, etc. The laser removal parameters provide the process details such as the power of the laser, the laser timing, the laser beam angle of incidence, and the like, such that the laser removal parameters 120 tune the laser removal process to meet the particular needs of an application. Laser removal 115 can treat one or more portions of the heat sink to remove a predetermined amount of the heat sink coating and/or create a predetermined surface finish of the treated portion based on the laser removal parameters 115. For example, the laser can be used to remove a predetermined amount of the coating in a predetermined portion of the heat sink via laser ablation. Removal of a specified amount of the total coating thickness can provide a desired surface finish of the remaining coating and/or desired thermal transfer characteristics from the light source to the heat sink. In an embodiment, the laser ablation can remove the coating entirely resulting in treatment directly to the heatsink. As a result, the surface of the heatsink acquires a predetermined surface roughness via peaks and valleys created by the laser ablation. In an embodiment, the laser ablation can remove portions of the coating while also affecting the surface of the heat sink. As a result, the mounting area may have surface finish impacted by a surface roughness from a combination of laser ablated coating and heat sink surface. The surface finish can be defined by lay, surface roughness, and waviness. Lay can correspond to a predominant surface pattern. Surface roughness can correspond to a measure of the finely spaced surface irregularities. Waviness can correspond to a measure of surface irregularities with spacing greater than that of surface roughness. Measuring surface finish and/or surface roughness can most commonly be done in values of "Ra" which are the mathematical averages of the difference in heights of the peaks and valleys measured for a specified area. Alternative, or additionally, the surface finish and/or surface roughness can also be measured in "Sa," which is the average over a specified line instead of an area. A wide-area 3D measurement system (e.g., VR-3000 from Keyence) may be used to measure the surface finish and/or surface roughness, for example. The laser removal parameters can also be adjusted to create a predetermined surface finish (via laser ablation), which may include a predetermined pattern, for example. The amount of the anodized coating removed, as well as the predetermined surface finish, can be tuned for characteristics of the light source such as power output. For example, the surface finish directly impacts the thermal and mechanical bond of the LED to the heatsink. By having a rough surface with large peaks and valleys (on microscopic scale) the contact between the two surfaces does not create the ideal thermal and mechanical bond. Similarly, with a smooth surface that has no peaks or valleys the adhesion does not create an optimized thermal and nuclear bond. However, with predetermined laser ablation parameters that correspond to the needs/requirements of a specific application, the surface roughness (e.g., the height of the peaks and valleys) can be optimized for the application. In other words, the coating is removed in the mounting region (e.g., treatment portion 220), and the removal of the coating (e.g., coating 210) creates the valleys and peaks corresponding to the predetermined surface roughness.

After one or more predetermined portions of the heat sink are treated, the light component can be placed on the one or more treated portions of the heat sink for light component assembly 125. The light component may be one or more solid state light sources, laser components etc. The assembly 125 can include placing the light component on the heat sink using a thermal paste, for example, with improved adhesion as a result of the treated portion of the heat sink. Laser removal parameters can be tuned to properties of the adhesive as well.

The solid state light source assembly from solid state light source assembly 125 can be used for product assembly 130. The product assembly may be a vehicle lighting device such as a headlight assembly.

FIG. 2A-FIG. 2D depicts exemplary cross sections of a heat sink according to one or more aspects of the disclosed subject matter.

Figure 2A:
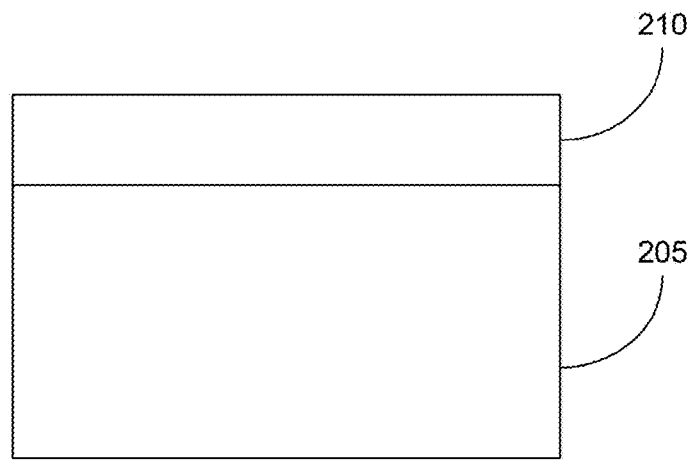
FIG. 2A depicts an exemplary cross section of a heat sink according to one or more aspects of the disclosed subject matter.

FIG. 2A depicts a cross section of a heat sink 205 having an anodized coating 210, for example. The heat sink 205 can be aluminum, for example, and the anodized coating can improve thermal performance of the heat sink itself, but can reduce adhesion and/or heat transfer for solid state light source placement. The anodized coating 210 can be a predetermined thickness suitable for thermal performance and other requirements of the heat sink.

Figure 2B:
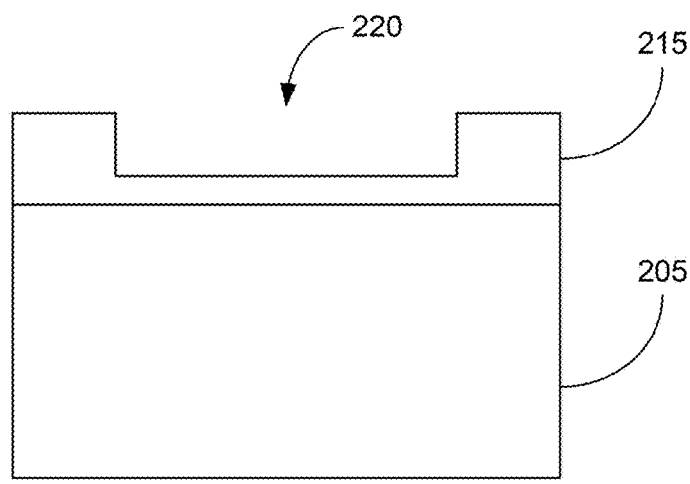
FIG. 2B depicts an exemplary cross section of a heat sink according to one or more aspects of the disclosed subject matter.

FIG. 2B depicts a cross section of a heat sink 205 with a post-process anodized coating 215, for example. The post-process anodized coating 215 can include a treatment portion 220 (e.g., a predetermined mounting region of the heat sink 205). The treatment portion 220 can have a predetermined amount of the anodized coating removed via laser ablation. The laser can be set to a predetermined power based on the type of coating and the amount of coating to be removed, for example. The post-process anodized coating can have a predetermined amount of the anodized coating removed from the treatment portion 220 to improve heat flow and adhesion of the solid state light source placed on the treatment portion 220.

Figure 2C:
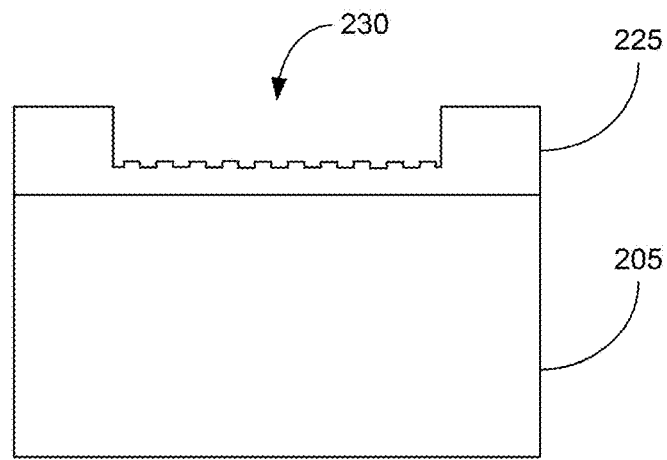
FIG. 2C depicts an exemplary cross section of a heat sink according to one or more aspects of the disclosed subject matter.

FIG. 2C depicts a cross section of a heat sink 205 with a post-process anodized coating 235, for example. The post-process anodized coating 235 can include a treatment portion 230. The treatment portion 230 can include a predetermined surface finish. The laser ablation parameters can be adjusted to create the predetermined surface finish of the treatment portion 230. The predetermined roughness can improve the adhesion and heat flow between the heat sink 205 and the solid state light source placed on the treatment portion 230. The heat flow can be improved based on less of the coating being between the solid state light source and the heat sink 205. The surface finish can be based on a predetermined roughness value and/or patterns in the coating (e.g., cross hatching) to further improve adhesion and heat flow. Laser treatment can also be applied to the heat sink 205 itself to achieve desired properties of the mounting surface.

Figure 2D:
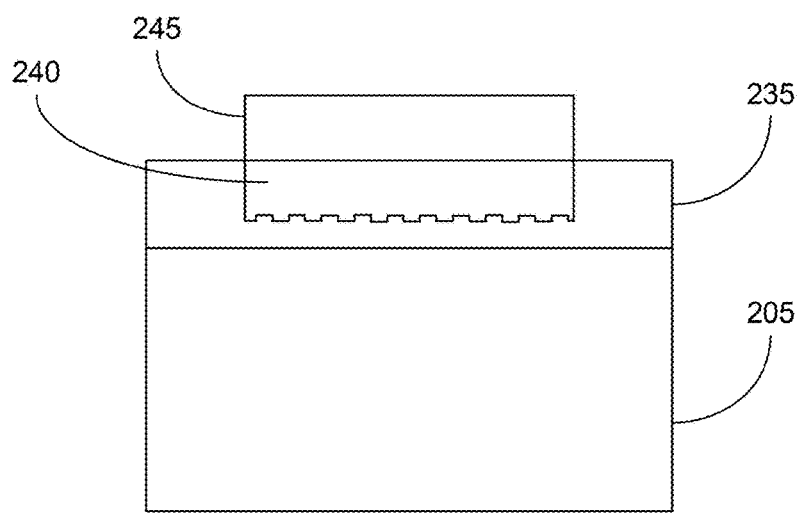
FIG. 2D depicts an exemplary cross section of a heat sink according to one or more aspects of the disclosed subject matter.

FIG. 2D depicts a cross section of a heat sink 205 with the post-process anodized coating 235. Additionally, a solid state light source 245 can be placed on the treatment portion of the heat sink 205 using a thermal paste 240. The laser ablation can be for placement of the solid state light source 245, adhesion, and heat flow. In general, increasing the amount of coating removed from the heat sink will reduce heat dissipation capability of the heat sink. An advantage of laser ablation is the precision with which the coating can be removed. For example, the laser can be used to treat precise areas of the coating sufficient for mounting the solid state light source. In general, increased surface finish provides greater heat radiation from the surface, but reduces the bonding strength of the solid state light source to the heat sink and reduces thermal transfer to the heat sink. An advantage of laser ablation is that the surface finish can be adjusted only in the mounting area of the heat sink so that the remaining area of the heat sink can retain the heat dissipation benefits of the coating. The precision and cost reduction can be significant, especially compared to masking which can be imprecise and expensive.

Mechanical connection of the light source to the heat sink is often required to meet shear force specifications. An advantage of laser ablation can be increased shear force. In other words, laser ablation can cause the solid state light source to be more difficult to remove from the heat sink, which makes the solid state light source more secure. More specifically, when the heat sink is fully anodized, the solid state light source can easily shear from the heat sink. However, when the anodization is removed, about three times more shear force is required to remove the solid state light source from the heat sink. Additional advantages of precise removal of the coating and the predetermined surface finish can include precise surface finish control, heat transfer benefits, and minimizing process costs. Partial removal of the anodized surface and control of the surface finish via laser ablation can provide adequate bonding and heat transfer of the solid state light source without unnecessary removal of coating. In other words, the laser ablation can adjust the amount of shear force required to remove the solid state light source so that the solid state light source is adequately secured to the heat sink in accordance with product requirements. The laser ablation can adjust the heat transfer between the solid state light source and heat sink. Both the shear force and the heat transfer can be adjusted to meet particular requirements while also the amount of anodized coating being removed. Minimizing the area of anodized coating being removed maximizes the thermal performance provided by the anodized coating.

Figures 3A, 3B:
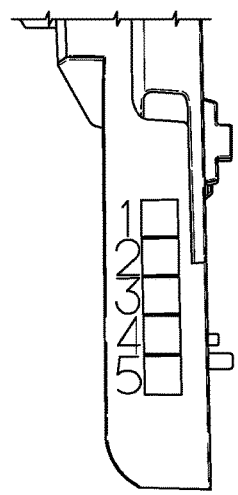
FIG. 3A depicts exemplary laser ablation results according to one or more aspects of the disclosed subject matter.
FIG. 3B depicts exemplary laser ablation parameters according to one or more aspects of the disclosed subject matter.

FIG. 3A depicts exemplary laser ablation results according to one or more aspects of the disclosed subject matter. More specifically, FIG. 3A depicts a device with a black anodized coating including five examples of laser ablation results, wherein each laser ablation result corresponds to a portion of the device that has received laser ablation to remove a predetermined amount of the anodized coating based on predetermined laser ablation parameters. As a result, the heat sink 205, for example, may have the anodized coating 210 removed via laser ablation based on one or more of the five laser ablation results of FIG. 3A and/or additional laser ablation results based on predetermined laser ablation parameters. Laser ablation result 1 may correspond to a measurement of 6.5 micrometers. Laser ablation result 2 may correspond to a measurement of 6.4 micrometers. Laser ablation result 3 may correspond to a measurement of 5.1 micrometers. Laser ablation result 4 may correspond to a measurement of 5.6 micrometers. Laser ablation result 5 may correspond to a measurement of 6.6 micrometers. It should be appreciated that one or more of the laser ablation results can correspond to the treatment portion 200, for example, where the laser ablation parameters used to create the laser ablation results in FIG. 3A can be applied to a predetermined location on the heat sink 205 to create the treatment area 220.

FIG. 3B depicts a table 300 of exemplary laser ablation parameters according to one or more aspects of the disclosed subject matter. The table 300 can include marking times, marking speed (mm/s), air conditioning speed (mm/s), Q frequency/kHz, Q release/second, and power (%). The table 300 of laser ablation parameters, or an extrapolation thereof, can be applied to create various treatment portions 200, for example. In an embodiment, one or more of the laser ablation parameters of the table 300, or an extrapolation thereof, can be applied to create laser ablation results 1 through 5 depicted in FIG. 3A. In an embodiment, the heat sink 205 can be a stamped aluminum plate with a 5-7 micrometer thick anodized coating (e.g., anodized coating 210), and laser parameters corresponding to 2500 mm/s marking speed, a 20 watt power setting, and 90 kHz frequency can create a surface roughness of the treatment area 220 to be Sa=1.8-2.4 micrometers.

Figure 4:
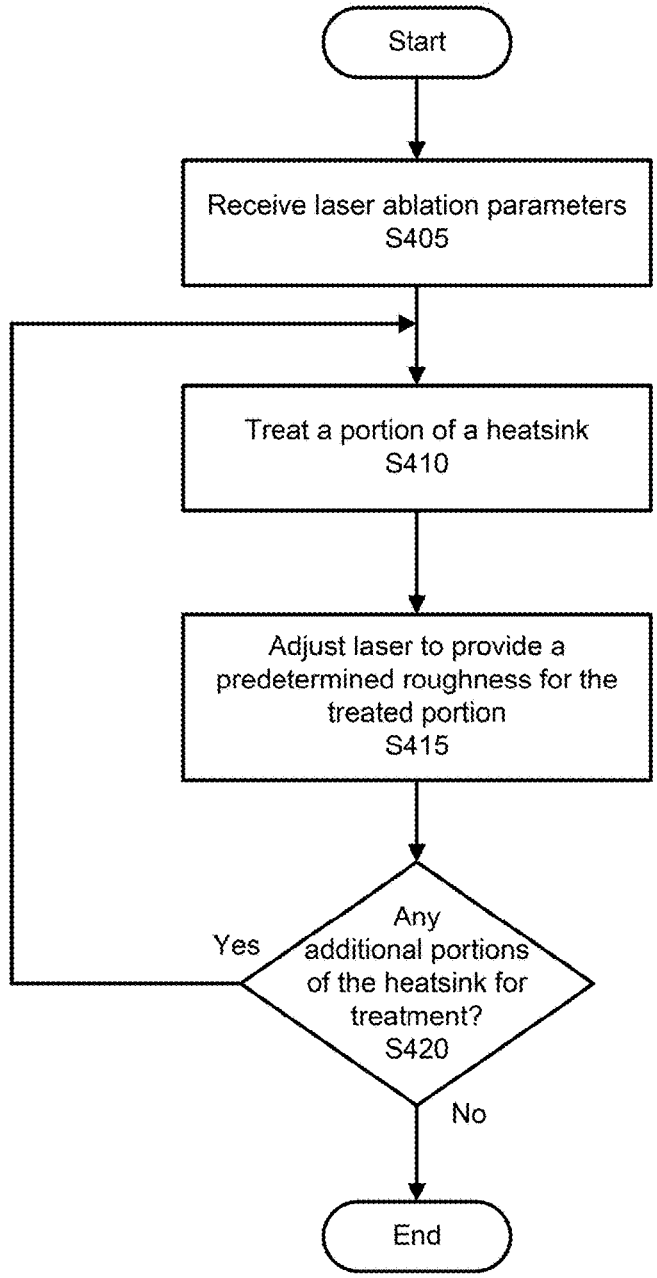
FIG. 4 depicts an algorithmic flow chart of an exemplary method for laser ablation according to one or more aspects of the disclosed subject matter.

FIG. 4 depicts an algorithmic flow chart of an exemplary method for laser ablation according to one or more aspects of the disclosed subject matter.

In S405, laser ablation parameters can be received. The laser ablation parameters can be based on the tables of FIG. 3A and FIG. 3B, for example. The laser ablation parameters can allow a predetermined amount of a predetermined coating to be removed, as well as to create a predetermined surface finish of a treated portion of a heat sink.

In S410, a portion of a heat sink can be treated. The portion of the heat sink can be treated with laser ablation to remove a predetermined amount of a coating of the heat sink based on the laser ablation parameters.

In S415, the laser can be adjusted to provide a predetermined surface finish of the treated portion of the heat sink based on the laser ablation parameters. The laser ablation can be to remove the predetermined amount of the coating of the heat sink, as well as to provide the predetermined surface finish of the treated area, to place a solid state light source on the treated portion of the heat sink. As a result of treating the heat sink and placing the solid state light source on the treated portion of the heat sink, the adhesion (e.g., via thermal paste) of the solid state light source to the heat sink can be improved. Additionally, the heat flow between the solid state light source and the heat sink can be improved.

In some embodiments, laser treatment parameters can be adjusted in consideration of throughput. For example, laser treatment parameters may initially be set to aggressively remove the coating in a short time. As the desired coating thickness is approached, laser parameters may be set to favor more precise control of the removal amount. Similarly, the entire coating can be aggressively removed, and the material of the heat sink treated using different treatment parameters.

In S420, it can be determined if any additional portions of the heat sink will be treated. If any additional portions of the heat sink will be treated, the process can return to S410 so that the additional portion of the heat sink can be treated. If no additional portions of the heat sink will be treated, the process can end.

Having now described embodiments of the disclosed subject matter, it should be apparent to those skilled in the art that the foregoing is merely illustrative and not limiting, having been presented by way of example only. Thus, although particular configurations have been discussed herein, other configurations can also be employed. Numerous modifications and other embodiments (e.g., combinations, rearrangements, etc.) are enabled by the present disclosure and are within the scope of one of ordinary skill in the art and are contemplated as falling within the scope of the disclosed subject matter and any equivalents thereto. Features of the disclosed embodiments can be combined, rearranged, omitted, etc., within the scope of the invention to produce additional embodiments. Furthermore, certain features may sometimes be used to advantage without a corresponding use of other features. Accordingly, Applicant(s) intend(s) to embrace all such alternatives, modifications, equivalents, and variations that are within the spirit and scope of the disclosed subject matter.

The invention claimed is:

1. A method of treating a heat sink for a light element, comprising:
   providing a heat sink having a coated surface;
   treating a mounting region of the coated surface by laser ablation, wherein the mounting region is for placing a light element on the heat sink; and
   adjusting parameters of the laser ablation treating to adapt the mounting region for mechanical coupling and thermal coupling of the light element to the heat sink.

2. The method of claim 1, wherein the heat sink is aluminum.

3. The method of claim 1, wherein the coated surface of the heat sink includes an anodized coating ranging in thickness from 6 micrometers to 8 micrometers.

4. The method of claim 1, wherein the scale with which laser ablation can treat the anodized surface is in micrometers.

5. The method of claim 1, wherein the predetermined roughness of the treated portion of the anodized surface includes predetermined patterns.

6. The method of claim 5, wherein the adjusting comprises adjusting the laser ablation to provide a predetermined pattern adapted for adhesion of the light element to the heat sink.

7. The method of claim 1, wherein the coated surface includes an anodized coating, an e-coating, or paint.

8. The method of claim 1, wherein the light element is a solid state light source.

9. The method of claim 1, wherein the laser parameters include marking times, marking speed (mm/s), air conditioning speed (mm/s), Q frequency/KHz, Q release/second, and power (%).

10. The method of claim 9, wherein predetermined laser parameters correspond to a predetermined surface roughness of the mounting region of the heat sink.

11. A heat sink for mounting a light element, comprising:
    a coating covering at least a portion of the surface of the heat sink;
    a mounting region on the coating and which is configured to mount the light element; and
    a light element placed on the mounting region, wherein the mounting region includes a predetermined surface roughness configured to provide mechanical coupling and thermal coupling requirements of the light element to the heat sink.

12. The heat sink of claim 11, wherein the coating includes an anodized coating, an e-coating, or paint.

13. The heat sink of claim 11, wherein the mounting region has a predetermined amount of said coating removed.

14. The heat sink of claim 11, wherein the predetermined roughness of the mounting regions is based on Ra roughness, wherein Ra roughness is the mathematical averages of the difference in heights of the peaks and valleys measured for a specified area.

15. The heat sink of claim 14, wherein the predetermined roughness of the mounting region corresponds to an Ra range of 1 micrometers to 5 micrometers.

16. The heat sink of claim 15, wherein the predetermined roughness of the mounting region is 2 micrometers.

17. The heat sink of claim 13, wherein the mounting region includes predetermined patterns wherein at least one of the predetermined patterns includes a cross-hatching pattern tuned for adhesion of the light element to the heat sink.

18. The heat sink of claim 11, wherein the coated surface of the heat sink includes an anodized coating ranging from 6 micrometers to 8 micrometers.

19. The method of claim 11, wherein the laser parameters include marking times, marking speed (mm/s), air conditioning speed (mm/s), Q frequency/KHz, Q release/second, and power (%).

20. The method of claim 19, wherein predetermined laser parameters correspond to a predetermined surface roughness of the mounting region of the heat sink.

* * * * *